United States Patent
Gondre et al.

(10) Patent No.: US 12,435,633 B2
(45) Date of Patent: Oct. 7, 2025

(54) FAN BLADE WITH ZERO TIP DIHEDRAL AT THE HEAD

(71) Applicant: Safran Aircraft Engines, Paris (FR)

(72) Inventors: Guillaume Pascal Jean-Charles Gondre, Moissy-Cramayel (FR); Stéphane Roger Mahias, Moissy-Cramayel (FR); Olivier Bazot, Moissy-Cramayel (FR); Guillaume Claude Robert Belmon, Moissy-Cramayel (FR); Charles-Henri Claude Jacky Sullet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/032,763

(22) PCT Filed: Oct. 19, 2021

(86) PCT No.: PCT/FR2021/051814
§ 371 (c)(1),
(2) Date: Apr. 19, 2023

(87) PCT Pub. No.: WO2022/084615
PCT Pub. Date: Apr. 28, 2022

(65) Prior Publication Data
US 2023/0392502 A1    Dec. 7, 2023

(30) Foreign Application Priority Data
Oct. 20, 2020 (FR) .................................. FR2010762

(51) Int. Cl.
F01D 5/14    (2006.01)

(52) U.S. Cl.
CPC .......... *F01D 5/141* (2013.01); *F05D 2250/38* (2013.01); *F05D 2300/6034* (2013.01)

(58) Field of Classification Search
CPC ................. F01D 5/141; F05D 2250/38; F05D 2300/6034
See application file for complete search history.

(56) References Cited

U.S. PATENT DOCUMENTS 6,328,533 B1 *  12/2001  Decker .................... F01D 5/141
                                          416/228
8,684,698 B2 *   4/2014  Breeze-Stringfellow ....................
                                          F04D 29/324
                                          416/243

(Continued)

FOREIGN PATENT DOCUMENTS

EP    1 106 836 A2    6/2001
EP    1 106 836 A3    5/2004

(Continued)

OTHER PUBLICATIONS

French Preliminary Search Report and Written Opinion for French Application No. 2010762, dated Jun. 24, 2021.

(Continued)

*Primary Examiner* — Christopher R Legendre
(74) *Attorney, Agent, or Firm* — BIRCH, STEWART, KOLASCH & BIRCH, LLP

(57) ABSTRACT

A blade (3) of a fan (1), made of composite material, of a turbomachine. On a portion (15) of the blade (7) which extends from a lower limit (16) located at a predetermined distance (d) from the shank (6) of the blade equal to at least 80% of the predetermined height (h) to the top (11) of the blade (7), a dihedral angle (D) measured at least one predefined point on the chord of the blade (3), located on the chord of the blade (3) at the upstream end (13a) of the nose (Continued)

(13) of the shield (12), is greater than or equal to −3° and less than or equal to 0°.

15 Claims, 3 Drawing Sheets

(56) References Cited

U.S. PATENT DOCUMENTS

| | | | | |
|---|---|---|---|---|
| 9,353,628 | B2* | 5/2016 | Gallagher | F04D 29/324 |
| 9,376,917 | B2* | 6/2016 | Murooka | F01D 5/147 |
| 9,605,542 | B2* | 3/2017 | Gallagher | F02K 3/06 |
| 9,677,404 | B2 | 6/2017 | Merville et al. | |
| 10,047,702 | B2* | 8/2018 | Sabnis | F02K 1/52 |
| 10,221,859 | B2* | 3/2019 | Moeckel | F04D 29/324 |
| 10,330,111 | B2* | 6/2019 | Billings | F02C 7/36 |
| 10,578,125 | B2* | 3/2020 | Duong | F04D 29/542 |
| 11,598,348 | B2 | 3/2023 | De Gaillard et al. | |
| 2014/0030105 | A1* | 1/2014 | Fameau | F01D 5/282 |
| | | | | 416/229 A |
| 2017/0252896 | A1* | 9/2017 | Gascher | B24C 1/10 |
| 2023/0392502 | A1* | 12/2023 | Gondre | F04D 29/324 |

FOREIGN PATENT DOCUMENTS

| | | |
|---|---|---|
| EP | 3 647 562 A1 | 5/2020 |
| WO | WO 2013/050724 A1 | 4/2013 |
| WO | WO 2015/126454 A1 | 8/2015 |
| WO | WO 2020/120921 A1 | 6/2020 |

OTHER PUBLICATIONS

International Search Report and Written Opinion of the International Searching Authority for International Application No. PCT/FR2021/051814, dated Dec. 14, 2021.

* cited by examiner

FAN BLADE WITH ZERO TIP DIHEDRAL AT THE HEAD

FIELD OF THE INVENTION

The invention relates generally to the field of turbomachines, and more particularly to that of the fan blades of these turbomachines and their manufacturing method.

The invention applies more particularly to fan blades made of composite material and their interaction with the inlet of the primary stream.

PRIOR ART

Turbomachine blades, and particularly fan blades, undergo high mechanical and thermal stresses and must satisfy strict conditions of weight and bulk. It has therefore been proposed to use blades comprising aerodynamic airfoils made of a composite material including a fibrous reinforcement densified by a polymer matrix, which are lighter compared with metallic blades with equivalent propulsive characteristics and which have satisfactory resistance to heat.

In order to stiffen them and to protect them, particularly in the event of a shock from an element ingested into the turbomachine such as a bird, the blades of composite material generally comprise a metal shield applied and attached to the leading edge of the blade. The shield comprises, in a manner known per se, a solid nose configured to face the leading edge of the blade and two fins configured to cover a part of the pressure side wall and of the suction side wall of the blade.

During the certification and life of an engine, the fan blades are subjected to the ingestion of birds and hailstones. However, depending on the type of object impacting the blade (and in particular its size, its mass) and depending on the type of fan (speed of rotation and number of blades), the favored zones for initiation and propagation of damage are different. The mechanical behavior of the fan blades is therefore optimized during the design phase of the blades to satisfy the certification rules.

In particular, in the case of large-diameter fans such as the fans of turbomachines with a very high bypass ratio (Ultra High Bypass Ratio, UHBR) comprising at most 20 fan blades, during the ingestion of medium-sized birds (medium birds), damage is likely to appear at the blade tip and the suction side fin of the shield can reverse and locally block the aerodynamic flow. However, this type of flow blockage has as a consequence a reduction of the thrust which the turbomachine can attain. Yet current requirements in the matter of safety are that a turbomachine must be capable, despite an object impact, of providing 75% of its takeoff thrust.

It has therefore been proposed to reduce the length of the fins in order to reduce the surface area blocking the aerodynamic flow in the event of the suction side fin reversing. However, during the ingestion of a medium-sized bird, the downstream edge of the fins has a tendency to pinch the composite material structure of the blade, which then has a tendency to deteriorate. To limit this pinching, it is therefore preferable to increase the length of the fins so that their edge is located facing a thicker portion of the composite material structure. However, this involves an increase in the surface area blocking the aerodynamic flow in the event of reversal of the fins.

DISCLOSURE OF THE INVENTION

One goal of the invention is to propose a fan blade and a turbomachine fan, particularly a large-diameter fan comprising at most twenty fan blades, which guarantees the ability of the fan to provide at least 75% of its takeoff thrust despite an impact of a medium-sized bird.

Another object of the invention is to propose a fan blade and a turbomachine fan, particularly a large diameter fan comprising at most twenty fan blades, having an optimized aeromechanical compromise.

To this end, according to a first aspect of the invention, a turbomachine fan blade is proposed comprising:

a structure of composite material comprising a fibrous reinforcement obtained by three-dimensional weaving and a matrix in which the fibrous reinforcement is embedded, the composite material structure comprising an airfoil with an aerodynamic profile able to extend in an air flow comprising a leading edge and a trailing edge, a root configured to be attached to a fan disk and a support extending between the root and the airfoil, the airfoil having a predetermined height between the support and a top of the airfoil along a stacking axis; and a metallic shield, applied and attached to the leading edge of the airfoil, the metallic shield comprising a nose attached to the leading edge.

Moreover, a chord of the blade is defined in a plane normal to the stacking axis, between an upstream end of the nose of the shield and the trailing edge, and over a portion of the blade which extends from a lower limit located at a predetermined distance from the support at least equal to 80% of the predetermined height to the top of the airfoil, a dihedral angle measured at one predefined point at least of the chord of the blade, located on the chord of the blade at the upstream end of the nose of the shield, is greater than or equal to −3° and less than or equal to 0°.

Certain preferred but non-limiting features of the fan blade according to the first aspect are the following, taken individually or in combination:

the nose and the fins of the shield delimit together a cavity housing the leading edge of the airfoil and the predefined point of the chord is located within the cavity;

the dihedral angle is greater than or equal to −3° and less than or equal to 0° at several predefined points of the blade chord within the portion of the blade;

within the portion, the dihedral angle is greater than or equal to −3° and less than or equal to 0° over a distance at least equal to 10% of the predetermined height, preferably over a distance at least equal to 15% of the predetermined height;

within the portion, the dihedral angle is greater than or equal −3° and less than or equal over the entire height of the portion 15;

within the portion, a variation of the dihedral angle along the stacking axis over a distance equal to 10% of the height of the airfoil is equal at most to 3°;

within the portion, the dihedral angle is greater than or equal to −2° and less than or equal to 0°, preferably greater than or equal to −1° and less than or equal to 0°; and/or the fins extend over a length greater than or equal to 15% and less than or equal to 25% of a chord length of the airfoil.

According to a second aspect, the invention proposes a fan for a turbomachine comprising a plurality of fan blades according to the first aspect.

Optionally, the fan comprises at most twenty fan blades and/or has an outer diameter of the fan [which] is comprised between eighty inches and one hundred inches, preferably between eighty inches and ninety inches.

According to a third aspect, the invention proposes a turbomachine comprising a fan according to the second aspect.

Optionally, the turbomachine comprises a bypass ratio greater than or equal to 10, comprised for example between 10 and 80 inclusive.

According to a fourth aspect, the invention proposes an aircraft comprising at least one turbomachine conforming to the third aspect.

DESCRIPTION OF THE FIGURES

Other features, goals and advantages of the invention will be revealed by the description that follows, which is purely illustrative and not limiting, and which must be read with reference to the appended drawings in which.

In all the figures, similar elements carry identical reference symbols.

DETAILED DESCRIPTION OF THE INVENTION

Figure 1:
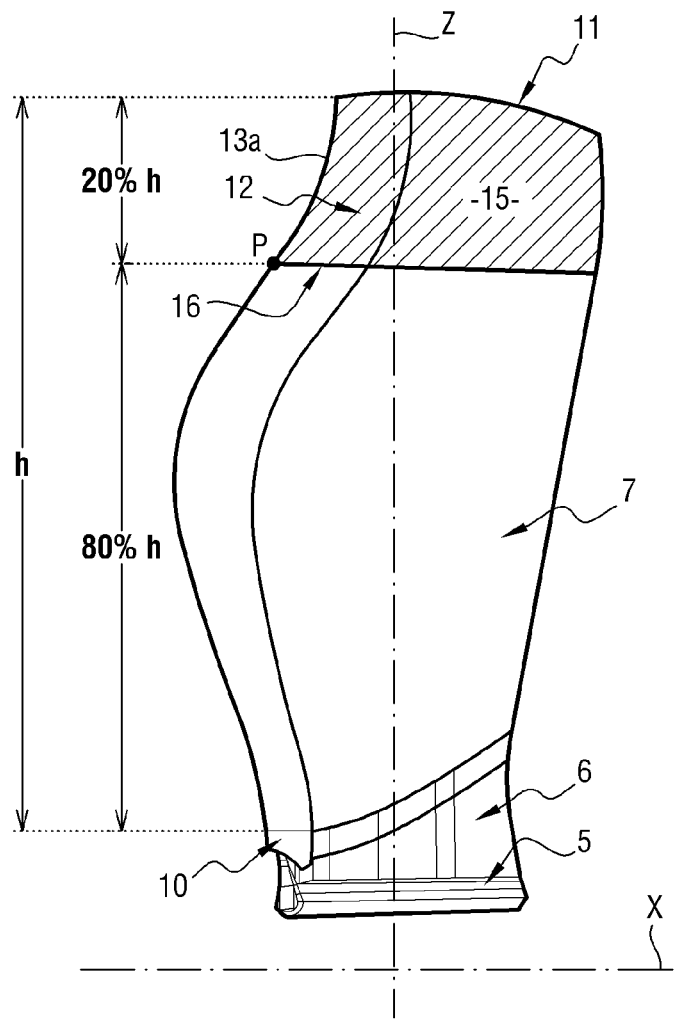
FIG. 1 illustrates schematically a blade according to a first embodiment of the invention.
Figure 2:
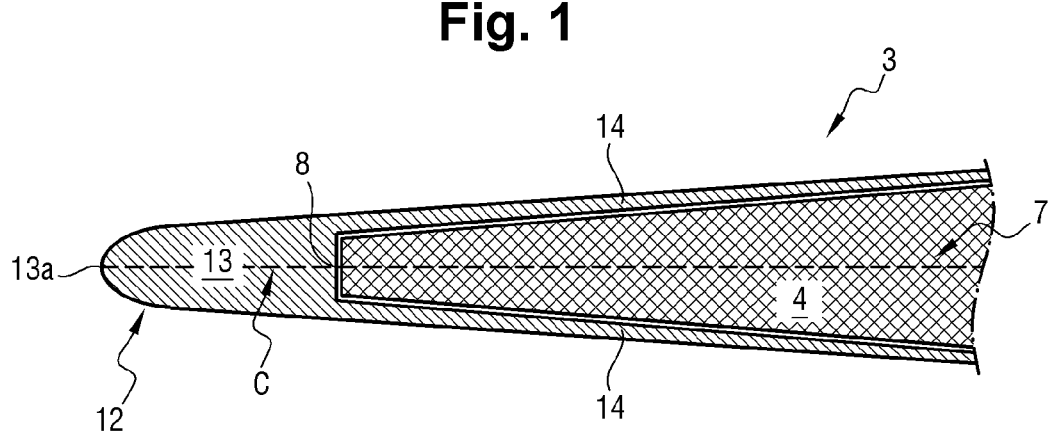
FIG. 2 is a partial section view from upstream of the blade according to one embodiment of the invention.

In the present application, upstream and downstream are defined with respect to the normal flow direction of gas in the fan 1 through the turbomachine. Moreover, the radial symmetry axis X of the fan 1 is called the axis of revolution of the turbomachine fan 1. The axial direction corresponds to the direction of the axis X of the fan 1, and a radial direction is a direction perpendicular to this axis and passing through it. Finally, internal and external will be used respectively with reference to a radial direction so that the internal part or face of an element is closer to the axis X than the external part or face of the same element.

A turbomachine fan 1 comprises a fan disk 2 bearing a plurality of fan blades 3, associated if necessary with inter-blade platforms.

The invention applies in a preferred manner to a fan comprising at most twenty blades 3 in a turbomachine with a very high bypass ratio, i.e. one in which the bypass ratio is greater than or equal to 10, comprised for example between 10 and 80 inclusive, more precisely for example 12 or 14 or 20 or more than 20. To calculate the bypass ratio, the flow rate of the secondary flow and the flow rate of the primary flow are measured when the turbomachine is stationary at takeoff power in a standard atmosphere (as defined by the manual of the International Civil Aviation Organization (ICAO), Doc 7488/3, $3^{rd}$ edition) and at sea level.

Each blade 3 comprises a structure of composite material including a fibrous reinforcement 4 obtained by three-dimensional weaving and a matrix in which the fibrous reinforcement 4 is embedded. This composite material structure comprises a root 5, a support 6 and an airfoil 7 with an aerodynamic profile. The root 5 is intended to allow the attachment of the blade to the fan disk 2 and extends for this purpose between a bottom of an impression formed in the disk 2 and the outlet of the bearing surfaces of the impression. The airfoil 7, for its part, has an aerodynamic profile capable of being placed in an air flow, when the turbomachine is operating, in order to generate a lift. Finally, the support 6 corresponds to the zone of the airfoil 7 which extends between the root 5 and the airfoil 7, i.e. between the outlet of the bearing surfaces of the disk 2 and the inter-blade platforms.

The airfoil 7 also comprises, in a manner known per se, a leading edge 8, a trailing edge 9, a pressure side wall and a suction side wall. The leading edge 8 is configured to extend facing the gas flow entering into the turbomachine. It corresponds to the leading part of an aerodynamic profile which faces the flow of air and divides the air flow into a pressure side flow and a suction side flow. The trailing edge 9, for its part, corresponds to the trailing part of the aerodynamic profile, where the pressure side and suction side flows re-join.

The blade 3 also comprises a metallic shield 12, applied and attached to the leading edge 8 of the airfoil. In a manner known per se, the shield 12 comprises a solid nose 13, attached to the leading edge 8, a pressure side fin 14 and a suction side fin 14 pressed and attached to the pressure side wall and the suction side wall of the airfoil 7, respectively. The shield 12 can in particular be attached by gluing. The shield 12 can be made for example of a titanium alloy.

Finally, the structure is formed of a plurality of blade sections 12 stacked from the root 5 toward the top 11 along a stacking axis Z extending radially relative to the axis of revolution X of the fan 1. A tangential stacking law of the blade then corresponds to the position of the center of gravity of each section of the blade in a plane normal to the stacking axis Z, relative to this stacking axis Z.

More precisely, the stacking of the airfoil sections 7 can be defined by sweep and dihedral angles. These angles measure the direction differences between the flow and the blades, in projection respectively in a plane that is radial and axial and in a plane that is axial and tangent to the direction of rotation of the turbomachine. Reference can be made in particular to the document of L. H. Smith et al. "Sweep and Dihedral Effects in Axial-Flow Turbomachinery," September 1963, *Journal of Basic Engineering*, 401-414, for a more complete definition of the sweep angle and the dihedral angle D.

If the flow is purely axial, which is the case overall at the inlet of the machine, and if for example a fixed blading is considered with a constant pitch over its height, the sweep angle expresses the inclination of the blade in the axial direction, and the dihedral angle D the inclination of the blade in the tangential direction. A negative sign of the sweep angle expresses an inclination in the upstream direction, and a positive sign a downstream direction; and a negative sign of the dihedral angle D expresses an inclination toward the pressure side and a positive sign toward the suction side. The inclinations are defined based on radially outward directions.

In what follows, a distance along the stacking axis Z will be designated a "height."

Thus, the airfoil 7 has a predetermined height h corresponding to the distance along the stacking axis Z between its lower limit 10, at the intersection with the support 6, and its top 11. The predetermined height h of the airfoil 7 can for example be measured at the intersection between the leading edge 8 and the lower limit 10 of the blade 7.

The blade 3 also has a chord (fictitious straight-line segment) defined, in a plane normal to the stacking axis Z, between an upstream end 13a of the nose 13 of the shield 12 and the trailing edge 9. In practice, the upstream end 13a of the nose 13 corresponds to the leading edge of the blade 3, i.e. the upstream part of the shield 12 which actually divides the flow of air into a pressure side flow and a suction side flow. The leading edge 8 of the airfoil 7, for its part, extends inside the shield 12, facing the nose 13, in the continuation of its upstream end 13a.

Figure 3:
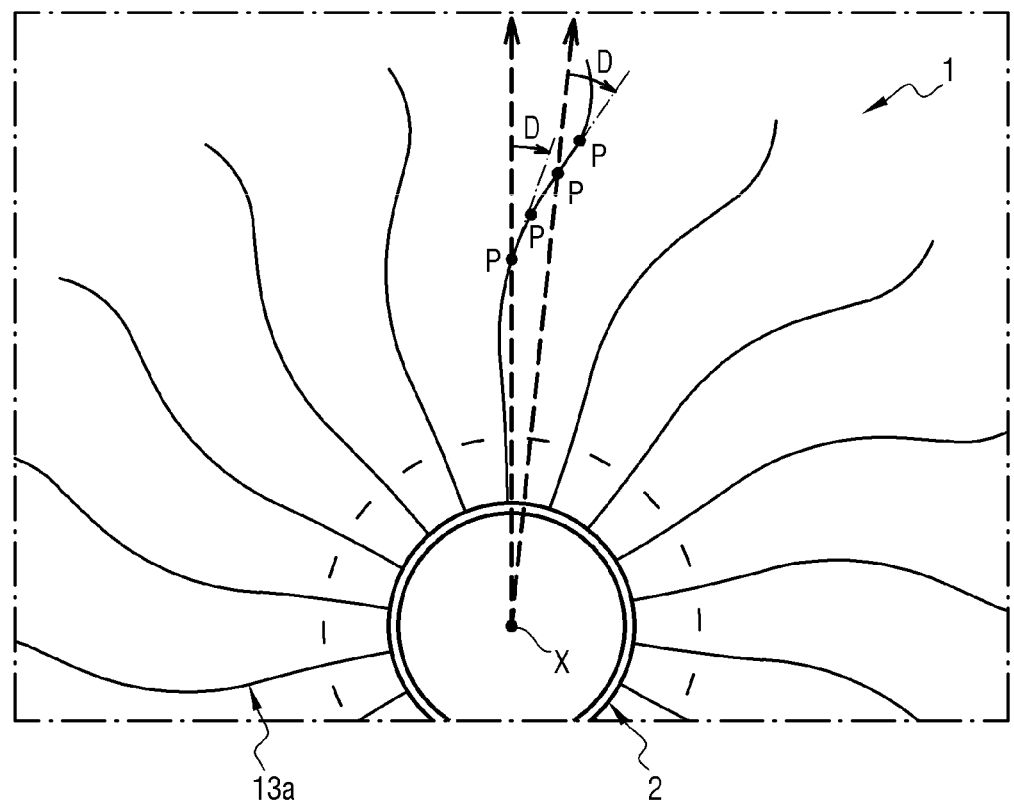
FIG. 3 is a schematic view of the fan rotor including blades conforming to one embodiment of the invention, shown in section along a plane perpendicular to the axis of revolution of the fan.
Figure 4:
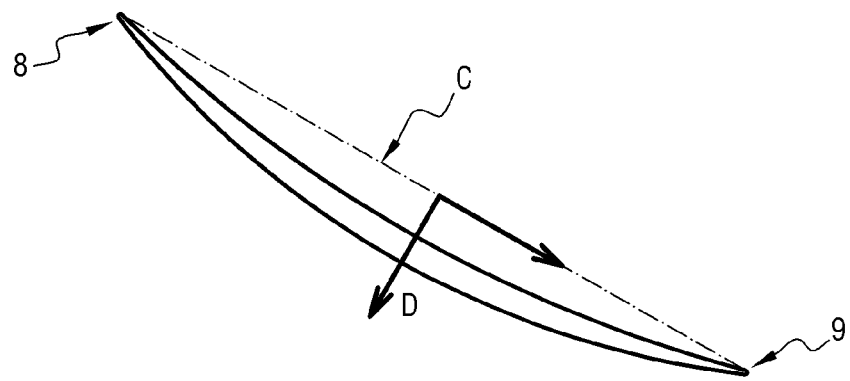
FIG. 4 is a section view of the blade according to one embodiment of the invention, along a plane which is, on the one hand, parallel to the axis of rotation of the fan, and on the other hand perpendicular to a direction in which the blade extends radially.
Figure 5:
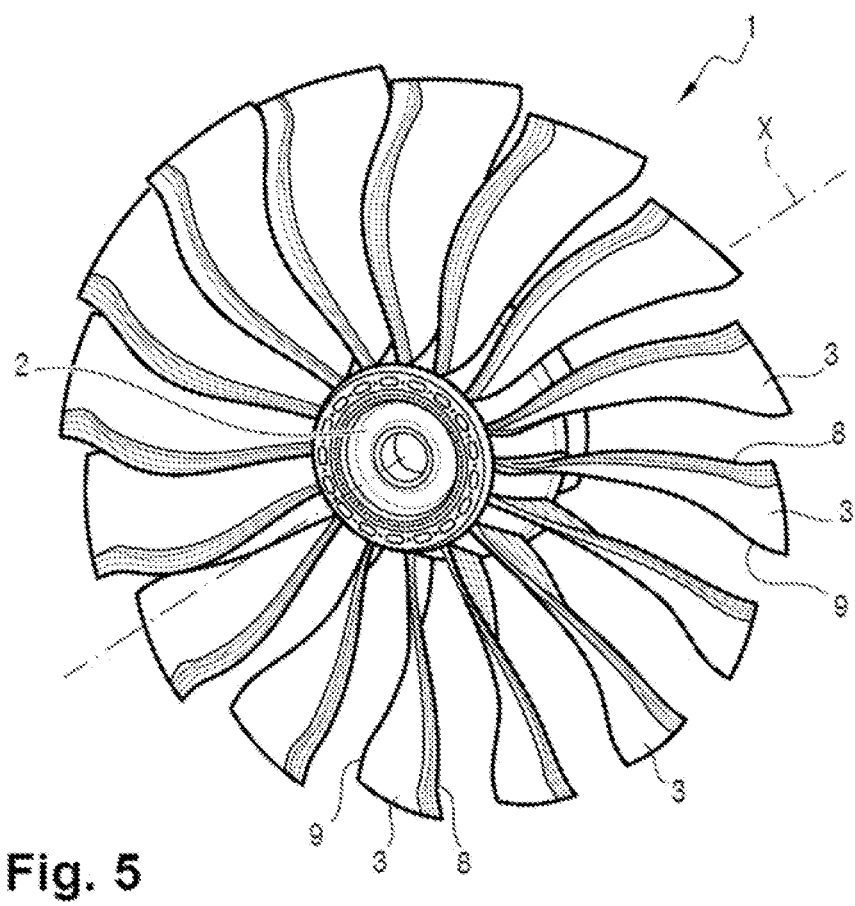
FIG. 5 is a schematic perspective view of the fan rotor having blades according to the invention.
Figure 6:
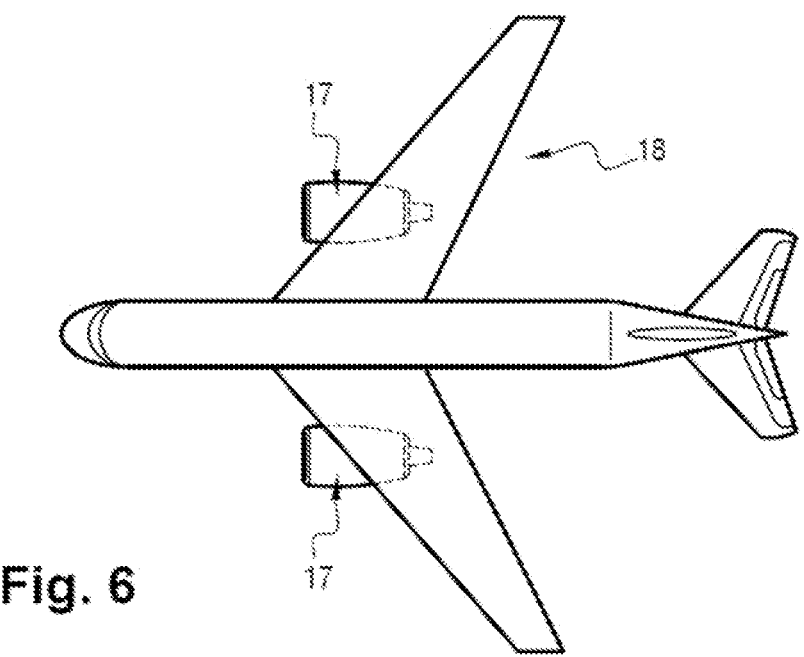
FIG. 6 is a schematic view of an aircraft comprising a fan provided with blades according to the invention.

In order to improve the resistance of the fan blade 3 to impacts (particularly medium-sized birds), within a portion 15 of the blade 3 which extends from a lower limit 16 located at a predetermined distance from the support 6 at least equal to 80% of the predetermined height h to the top 11 of the airfoil 7, a dihedral angle D (shown schematically in FIG. 3 and in FIG. 4) measured at one predefined point at least of the blade 3 chord, is greater than or equal to −3° and less than or equal to 0°. In one embodiment, within the portion 15, the dihedral angle D is greater than or equal to −3° and less than or equal to 0° over a distance at least equal to 10% of the predetermined height, preferably over a distance at least equal to 15% of the predetermined height. In one embodiment, the dihedral angle D is greater than or equal to −3° and less than or equal to 0° over the entire height of the portion 15: in other words, in this embodiment, the dihedral angle D is greater than or equal to −3° and less than or equal to 0° is each section of the blade 3, i.e. at the at least one predefined point P of each chord C over the entire height of the portion 15, between 80% and 100% of the height h.

In this manner, in the event of separation of the suction side fin 14, the shape of the blade 3 at this portion 15 has a tendency to press the suction side fin 14 against the suction side wall of the airfoil 7 under the influence of the centrifugal forces. In fact, in this portion 15 of the blade 3, the blade 3 is slightly inclined toward the pressure side, which counteracts the centrifugal forces applied to the suction side wall.

Preferably, the point of the chord at which the dihedral angle D is measured is located in the shield 12, i.e. within the cavity of the shield 12 which houses the leading edge and which is delimited by the nose 13 and the fins 14 of the shield 12.

As a variant, the point of the chord can extend to the upstream end 13a of the nose 13 of the shield 12, i.e. at the leading edge of the blade 3. This position of the point of the chord has the advantage of simplifying the measurement and the checking of the dihedral angle D at the portion 15, while still guaranteeing that the portion 15 of the blade 3 is slightly inclined toward the pressure side and avoids the reversal of the fin 14.

In one embodiment, within this portion 15 of the blade 3, the dihedral angle D is greater than or equal to −3° and less than or equal to 0° at several points of the chord.

In one embodiment, in this portion 15 of the blade 3, the dihedral angle D is closest to 0° while still remaining negative. Thus, in one embodiment, the dihedral angle D is preferably greater than or equal to −2°, typically greater than or equal to −1°, and less than or equal to 0°.

Due to the configuration of the blade 3 in the portion 15, the pressure side and suction side fins 14 of the shield 12 can be lengthened in comparison with the prior art, thus reducing the risks of pinching of the fibrous reinforcement 4 in the event of ingestion (the fibrous reinforcement being thicker at a distance from the leading edge 8). Typically, at least at the portion 15 and over the entire length of this portion 15, the pressure side and suction side fins 14 extend over a length greater than or equal to 15% and less than or equal to 25% of the length of the chord of the airfoil. By chord of the airfoil, it should be understood herein the segment connecting the leading edge 8 and the trailing edge 7, in a plane normal to the stacking axis Z. By chord length, it should be understood the length of this segment. By length of a fin 14, it should be understood herein the projection of this fin onto the chord in the plane normal to the axis Z.

In one embodiment, the fan 1 has an external diameter comprised between eighty inches (203.2 centimeters) and one hundred inches (254.0 centimeters), preferably between eighty inches (203.2 centimeters) and ninety inches (228.6 centimeters).

The fibrous reinforcement 4 can be formed from a fibrous preform in a single piece obtained by three-dimensional or multilayer weaving with varying thickness. It comprises warp and weft strands which can in particular comprise carbon, glass, basalt and/or aramid fibers. The matrix, for its part, is typically a polymer matrix, for example epoxy, bismaleimide or polyimide. The blade 3 is then formed by molding by means of a resin vacuum injection process of the RTM (for "Resin Transfer Molding"), or VARRTM (for Vacuum Resin Transfer Molding) type.

The invention claimed is:

1. A turbomachine fan blade comprising:
   a structure of composite material comprising a fibrous reinforcement obtained by three-dimensional weaving and a matrix in which the fibrous reinforcement is embedded, the composite material structure forming an airfoil with an aerodynamic profile comprising a leading edge, a trailing edge, a root configured to be attached to a fan disk of the turbomachine fan and a shank extending between the root and the airfoil, the airfoil having a predetermined height between the shank and a top of the airfoil along a stacking axis; and
   a metallic shield applied and attached to the leading edge of the airfoil, the metallic shield comprising a nose attached to the leading edge and fins that delimit with the nose a cavity housing the leading edge of the airfoil;
   a chord of the blade being defined, in a plane normal to the stacking axis, between an upstream end of the nose of the shield and the trailing edge;
   wherein the airfoil further comprises a portion, which extends from a lower limit to the top of the airfoil, wherein the lower limit is located at a predetermined distance from the shank at least equal to 80% of the predetermined height,
   wherein a dihedral angle is greater than or equal to −3° and less than or equal to 0° in the portion of the airfoil over a distance at least equal to 10% of the predetermined height,
   wherein the dihedral angle is a local direction difference between a gas flow through the turbomachine and the blade in projection in a plane that is axial and tangent to the direction of rotation of the turbomachine,
   wherein the dihedral angle is measured along the leading edge, wherein the dihedral angle changes sign at least one time along the leading edge from the shank to the top of the airfoil.

2. The turbomachine fan blade according to claim 1, wherein the dihedral angle is greater than or equal to −3° and less than or equal to 0° at several predefined points of the chord of the blade within the portion of the blade.

3. The turbomachine fan blade according to claim 1 wherein, within the portion, the dihedral angle is greater than or equal to −3° and less than or equal to −1° over a distance at least equal to 15% of the predetermined height.

4. The turbomachine fan blade according to claim 1 wherein, within the portion, the dihedral angle is greater than or equal to −3° and less than or equal to −1° over the entire height of the portion.

5. The turbomachine fan blade according to claim 1, wherein, within the portion, a variation of the dihedral angle along the stacking axis over a distance equal to 10% of the height of the airfoil is equal to 3° at most.

6. The turbomachine fan blade according to claim 1, wherein, within the portion, the dihedral angle is greater than or equal to −2° and less than or equal to −1°.

7. The turbomachine fan blade according to claim 1, wherein the fins extend over a length greater than or equal to 15% and less than or equal to 25% of a chord length of the airfoil.

8. A fan for a turbomachine comprising a plurality of turbomachine fan blades according to claim 1, the turbomachine fan blades being connected to a fan disk of the fan.

9. The fan according to claim 8, comprising at most twenty fan blades.

10. The fan according to claim 8, having an outer diameter of the fan comprised between eighty inches and one hundred inches.

11. The fan according to claim 8, having an outer diameter of the fan comprised between eighty inches and ninety inches.

12. A turbomachine comprising a fan according to claim 8.

13. The turbomachine according to claim 12 having a bypass ratio greater than or equal to 10.

14. The turbomachine according to claim 12 having a bypass ratio comprised between 10 and 80 inclusive.

15. An aircraft comprising at least one turbomachine according to claim 12.

* * * * *